United States Patent [19]

Kass et al.

[11] Patent Number: 5,433,770
[45] Date of Patent: Jul. 18, 1995

[54] PSA PROCESS EMPLOYING A RAPID DEPRESSURIZATION STEP TO CREATE A DISEQUILIBRIUM EFFECT

[75] Inventors: Lawrence T. Kass, White Plaines; William B. Dolan, Dobbs Ferry, both of N.Y.

[73] Assignee: UOP, Des Plaines, Ill.

[21] Appl. No.: 173,386

[22] Filed: Dec. 27, 1993

[51] Int. Cl.$^6$ ............................................. B01D 53/047
[52] U.S. Cl. ......................................... 95/103; 95/143; 95/148
[58] Field of Search ................................... 95/96–103, 95/143, 147, 148

[56] References Cited

U.S. PATENT DOCUMENTS

| | | | |
|---|---|---|---|
| 2,944,627 | 7/1960 | Skarstrom | 183/4.7 |
| 3,176,444 | 4/1965 | Kiyonaga | 55/26 |
| 3,430,418 | 3/1969 | Wagner | 55/25 |
| 3,564,816 | 2/1971 | Batta | 55/26 |
| 3,636,679 | 1/1972 | Batta | 95/100 |
| 3,986,849 | 10/1976 | Fuderer et al. | 55/25 |
| 4,059,505 | 11/1977 | Cartwright et al. | 208/310 Z |
| 4,077,780 | 3/1978 | Doshi | 95/100 |
| 4,194,892 | 3/1980 | Jones et al. | 55/58 |
| 4,264,339 | 4/1981 | Juntgen et al. | 55/25 |
| 4,348,213 | 9/1982 | Armond | 95/103 |
| 4,376,640 | 3/1983 | Vo | 55/26 |
| 4,455,444 | 6/1984 | Kulprathipanja et al. | 95/143 X |
| 4,455,445 | 6/1984 | Neuzil et al. | 95/143 X |
| 4,548,799 | 10/1985 | Knoblauch et al. | 423/351 |
| 4,608,061 | 8/1986 | Volles et al. | 55/26 |
| 4,650,500 | 3/1987 | Patel | 95/100 |
| 4,650,501 | 3/1987 | Hiscock et al. | 95/100 |
| 4,726,816 | 2/1988 | Fuderer | 55/26 |
| 4,925,461 | 5/1990 | Gemba et al. | 55/26 |
| 4,964,888 | 10/1990 | Miller | 55/38 |
| 5,051,115 | 9/1991 | Leitgeb et al. | 55/26 |
| 5,108,467 | 4/1992 | Schroter et al. | 55/25 |
| 5,146,037 | 9/1992 | Zarchy et al. | 585/738 |
| 5,248,322 | 9/1993 | Kumar | 95/143 X |

OTHER PUBLICATIONS

Yang, R. T., *Gas Separation by Adsorption Processes.* Boston: Butterworth, 1987.

Lukchis, George M. "Adsorption Systems, Part I—Design by Mass-Transfer Zone," *Chemical Engineering*, (Jun. 11, 1973) pp. 111–116.

Lukchis, George M. "Adsorption Systems Part II—Equipment Design," *Chemical Engineering*, (Jul. 9, 1973) pp. 83–87.

Lukchis, George M. "Adsorption Systems Part III—Adsorbent Regeneration," *Chemical Engineering*, (Aug. 6, 1973) pp. 83–90.

Lu, Z. P. "Intraparticle Diffusion/Conversion Model for Pressurization and Blowdown of Adsorption Beds with Langmuir Isotherms", 27 Separation and Technology (1992) at 1857.

Yang, Ralph T. and Ackley, Mark W. "Kinetic Separation by Pressure Swing Adsorption: Method of Characteristics Model," 36 *AIChE Journal* (1990) at 1229.

Cassidy, Robert T. and Holmes, Ervine S. "Twenty-Five Years of Progress in 'Adiabatic' Adsorption Processes" AIChE Symposium Series Article, 1984.

Richter, E. et al., "Modelling of Desorption by Depressurization as Partial Step in Gas Separation by Pressure Swing Adsorption," *Germ. Chemical Engineering*, 5, 1982 pp. 147–156.

*Primary Examiner*—Robert Spitzer
*Attorney, Agent, or Firm*—Thomas K. McBride; John G. Tolomei; Richard P. Silverman

[57] ABSTRACT

A pressure swing adsorption (PSA) process is provided for the size-selective separation of a feedstream into an adsorbate fraction employing a rapid blowdown step to induce a state of disequilibrium within an adsorbent bed and thereby increase the weight hourly space velocity of the process. The selective separation mechanism explored in the PSA process may also include equilibrium separation. The benefits include a reduced adsorbent bed size for new installations or increased feed rates for existing facilities. In one aspect of the invention the feedstream to be separated comprises iso and normal pentane.

24 Claims, 4 Drawing Sheets

Figure 1

CYCLE SEQUENCE CHART

TIME, min

| | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| BED 1 | ADSORPTION | | | | BLOWDOWN | | | | DESORPTION | | | R | ADSORPTION | | | | |
| BED 2 | | | | | R | ADSORPTION | | | | | BLOWDOWN | | DESORPTION | | | | R |
| BED 3 | BLOWDOWN | | | | DESORPTION | | | | R | ADSORPTION | | | | BLOWDOWN | | | |

PSA PROCESS EMPLOYING A RAPID DEPRESSURIZATION STEP TO CREATE A DISEQUILIBRIUM EFFECT

FIELD OF THE INVENTION

This invention relates generally to adsorption processes. This invention relates more specifically to vapor phase pressure swing adsorptive separation processes wherein the primary separation mechanism is either size exclusion or a difference in adsorptive strength.

BACKGROUND OF THE INVENTION

Pressure swing adsorption (PSA) is an adsorption process in which a gas mixture is contacted with a fixed adsorbent bed at high pressure to effectuate the removal of certain "adsorbate" constituents from the mixture. Although desorption can be accomplished by several means, the common characteristic of PSA adsorption cycles is that the adsorbent bed is regenerated by depressurizing and, in some applications, purging at low pressure. PSA enjoys commercial success in the areas of air separation, natural gas processing, solvent production, and various refinery applications. An account of the milestones in adiabatic adsorptive separations was given in the 1984 AIChE Symposium Series article, *Twenty-Five years of Progress in "Adiabatic" Adsorption Processes*, by Robert T. Cassidy and Ervine S. Holmes. PSA is an established unit operation with a myriad of applications.

The pressure swing adsorption process provides an efficient and economical means for separating a multi-component gas feed stream containing at least two gases having different adsorption characteristics. The adsorbable component can be an impurity that is removed from the less adsorbable component, which is taken off as a product, or the more adsorbable component can be the desired product, which is separated from the less adsorbable gas. For example, it may be desired to remove carbon monoxide and light hydrocarbons from a hydrogen-containing feed stream to produce a purified, i.e., 99+% hydrogen stream suitable for hydrocracking or other catalyst process where these impurities could adversely affect the catalyst or the reaction. On the other hand, it may be desired to recover more strongly adsorbable gases, such as ethylene from a feed stream to produce an ethylene-rich product.

In typical pressure swing adsorption, a multi-component gas is fed to at least one of a plurality of adsorbent beds at an elevated pressure effective to adsorb at least one component, i.e., the adsorbate fraction, while at least one other component passes through, i.e., the non-adsorbed fraction. At a defined time, the feed stream to the adsorbent bed is terminated and the adsorbent bed is depressurized by one or more cocurrent depressurization steps wherein pressure is reduced to a defined level. This permits the separated, less strongly adsorbed component or components remaining in the adsorption zone to be drawn off without significant concentration of the more strongly adsorbed components. The released gas typically is employed for pressure equalization and for subsequent purge steps. In the art and as used herein, "pressure equalization" means the connection of an adsorber at high pressure to an adsorber at low pressure until the pressures in the two adsorbers are equalized. The bed is thereafter countercurrently depressurized and often purged to desorb the more selectively adsorbed component of the feed stream from the adsorbent and to remove such gas from the feed end of the bed prior to the repressurization thereof to the adsorption pressure.

Such PSA processing is disclosed in U.S. Pat. No. 3,430,418 to Wagner, U.S. Pat. No. 3,564,816 to Batta and in U.S. Pat. No. 3,986,849 to Fuderer et at., wherein cycles based on the use of multi-bed systems are described in detail. As is generally known and described in these patents, the contents of which are incorporated herein by reference as if set out in full, the PSA process is generally carried out in a sequential processing cycle that includes each bed of the PSA system.

There are three basic mechanisms that are employed in PSA separations. They are rate selective, size-exclusive, and equilibrium selective. In rate selective separation, the primary driving force for the separation is the difference in the rates of adsorption, desorption, and diffusion of the various components in the gas to be separated. Thus, the flux of the adsorbable component into and out of the adsorbent controls the separation process steps within the PSA cycle. In size-exclusive separation, the primary mechanism for the separation of feed gas components is based on the size of the component molecules relative to the size of the adsorbent pores. The larger or bulkier molecules are simply excluded from the adsorbent while the smaller or narrower molecules are adsorbed, and the adsorbent pore dimensions determine which component is adsorbed and which is excluded. In equilibrium selective adsorption, it is the affinity for the adsorbent, or relative strength of adsorption of one component relative to another, which controls the separation. The less strongly adsorbed component becomes the non-adsorbable component and the most strongly adsorbed becomes the adsorbable component.

In size-exclusive and equilibrium selective driven fixed bed adsorption processes, mass transfer characteristics impact on efficiency and bed size. Due to mass transfer dynamics, an adsorbate concentration profile develops at the leading edge of the adsorption front as the front progresses through the bed. The term, "mass transfer zone," is familiar to those skilled in the art, and refers to the region that encompasses this profile, the leading edge of which contains a minimum concentration of adsorbate, and the trailing end of which contains the feed concentration of adsorbate. In order to obtain high purity, high pressure product, the adsorption step of a PSA cycle is usually discontinued before the leading edge of the mass transfer zone reaches the bed outlet. As a result, the adsorbent in the mass transfer zone is not fully loaded to its equilibrium capacity. For a discussion of mass transfer zone concepts and related adsorption topics, see: Lukchis, Adsorption Systems, Pan I-Design by Mass-Transfer-Zone Concept, Chemical Engineering, Jun. 11, 1973 at pp. 111–116; Lukchis, Adsorption Systems, Pan II-Equipment Design, Chemical Engineering, Jul. 9, 1973 at pp. 83–87; Lukchis, Adsorption Systems, Pan III-Adsorbent Regeneration, Chemical Engineering, Aug. 6, 1973 at pp. 83–90, the contents of which are herein incorporated by reference. Because the adsorbent in the mass transfer zone is not fully loaded and is, therefore, inefficient, inventors have sought to decrease the width of the mass transfer zone by improving mass transfer characteristics. By decreasing the width of the inefficient mass transfer zone, the overall adsorbent inventory requirement is decreased, and smaller beds result.

U.S. Pat. No. 5,051,115, issued to Leitgeb, et. at., discloses another method of improving PSA adsorption efficiency via mass transfer zone width minimization wherein an adsorber is repressurized in four steps. The first step comprises a pressure build-up phase with a weakly adsorbable gas; the second step continues pressure build-up with expansion gas from another, depressurizing adsorber; the third step effects further pressure build-up with high-pressure product gas from another, adsorbing adsorber; and the final step completes repressurization with feed. The reduction in mass transfer zone width is achieved by performing these repressurization steps within respectively specified pressure ranges, with the end result that yield is increased or adsorbent inventory is reduced.

It is known in the art that adsorption mass transfer characteristics are dependent on the velocity of the front and the rate at which adsorbate diffuses from the interparticle voids into the micropores of the adsorbent. The rate at which adsorbate diffuses, in turn, is highly dependent on temperature, concentration gradient, and particle size. Resistance to mass transfer also imposes other limitations on PSA designs, most prominently on desorption. Due to the rate limitation, the most important desorption design parameters are those that affect diffusion rates (such as temperature, particle size, driving force via concentration, and adsorbent diffusivity or permeability). The dynamics of the intermediate blowdown step are also mass transfer limited, but blowdown has traditionally received less attention because its effluent usually constitutes a small fraction of the overall product and because the rapid pressure changes complicate modelling and experimentation. A discussion of the effect of permeability and particle size is given by Lu, Intraparticle Diffusion/Convection Models for Pressurization and Blowdown of Adsorption Beds with Langmuir Isotherm, 27 Separation Science and Technology at 1857 (1992). The article teaches that the minimum blowdown time is set by the time required to reach near-equilibrium.

Rate-selective adsorption processes operate on the principal that preferential desorption occurs, not due to differences in adsorptive strength or by virtue of size exclusion, but by virtue of differences in component diffusivity and adsorption and desorption rates. Generally, molecules with smaller kinetic diameters will diffuse and adsorb more rapidly than those with large diameter. For example, nitrogen is separated from air using molecular sieve carbon (MSC). Although nitrogen is more strongly adsorbed on MSC at equilibrium, oxygen diffuses and adsorbs more rapidly. Therefore, oxygen is the preferentially adsorbed component despite its lower adsorptive strength. Examples of process improvements on the rate selective separation of nitrogen from air on MSC are U.S. Pat. No. 4,264,339, issued to Juntgen, and U.S. Pat. No. 4,376,640, issued to Vo. Juntgen's patent teaches that nitrogen purity, which was previously attainable only to 99.5, can be produced in 99.9% purity by adsorbing at continuously increasing pressure. Vo's patent describes a nitrogen from air separation improvement using MSC, whereby, during the latter portion of an adsorption step, high pressure effluent is used to repressurize a vessel that has just completed the desorption step.

U.S. Pat. No. 4,548,799, issued to Knoblauch et al., represents an improvement of the rate selective separation of nitrogen from oxygen-containing gas mixtures; in a two-bed system, nitrogen product purity is increased by discontinuing a pressure equalization step at between 0.3 to 0.7 seconds. The inventors teach that the oxygen content in the equalization stream increases with time and that, by discontinuing pressure equalization between 0.3 to 0.7 seconds, the equalization step ends before the increased oxygen content becomes counter-productive to product purity. It is not clear from the specification whether the source of the increased oxygen content is from oxygen desorption or whether it is simply oxygen from feed that previously occupied the interparticle voids in the lower regions of the bed.

U.S. Pat. No. 4,925,461, issued to Gemba et al., discloses a similar improvement of the rate selective separation of nitrogen from oxygen-containing gas mixtures. In multiple bed systems, a pressure equalization step is carried out by: connecting the inlets and outlets of each of the paired vessels; maintaining transfer flow between the inlets at 3 to 70 percent of the transfer flow between the outlets; discontinuing the step before the pressures in the paired vessels equalize; and feeding a back flow of product gas to the adsorber to be regenerated. The inventors teach that the beneficial effect of discontinuing the pressure equalization step early is due to the avoidance of rapid desorption of adsorbed components after pressure equalization. By these improvements, the nitrogen product, which had been previously limited to 99.9 percent purity, is thereby increased to 99.99 percent purity.

The growing importance of rate selective separation for air separation and for enhanced oil recovery has, in part, stimulated the development of advanced mathematical models that can predict mass transfer effects on the concentration profiles within an adsorbent bed. One approximation that is often used in the development of such models is the "frozen solid assumption," where it is assumed that no adsorption or desorption occurs during periods of rapid pressure change. The approximation was used in Yang, "Kinetic Separation by Pressure Swing Adsorption: Method of Characteristics Model," 36 AIChE Journal at 1229 (1990), an article that discusses a rate selective PSA separation. However, in Gas Separation by Adsorption Processes, Butterworth, Boston, 1987, Yang pointed out that the frozen solid assumption can lead to error when equilibrium conditions are nearly reached within the blowdown step. Such would often be the case in size-exclusive and equilibrium selective PSA separation processes.

In rapid pressure swing adsorption (RPSA) processes, small beds containing fine particle adsorbent are cycled rapidly to provide greater adsorbent productivity and a continuous product effluent. The basic cycle consists of a feed step and an exhaust step; the separation is driven by differences in adsorptive strength (equilibrium selective) or by size exclusion (size exclusive selective); and its advantages include smaller equipment size and the ability to operate with a single bed. U.S. Pat. No. 4,194,892, issued to Jones, et at., improved the cycle, which previously consisted of equal feed and exhaust times, by decreasing the feed time/(feed time plus exhaust time) ratio and incorporating a flow-suspension step between the feed and exhaust steps. In addition, smaller particle size was recognized as an advantage because smaller particles would improve mass transfer during the exhaust step. As illustrated by these improvements, RPSA benefits from an increase in mass transfer during the exhaust step. This is because the quantity of desorption product collected during exhaust is limited by mass transfer. Thus, in RPSA, high mass transfer rates improve the performance of the invention by increasing the approach to equilibrium during the RPSA depressurization/desorption step.

Generally, in size exclusive PSA applications, mass transfer rate has been a determining factor in the design of blowdown or pressure equalization steps. The separation of normal and isoparaffins using 5A molecular sieve is one such example. The separation is based on the size-exclusion of the branched isoparaffins from the adsorbent pores and the admission and adsorption of the normal paraffins, which are straight chain hydrocarbons. U.S. Pat. No. 5,146,037, issued to Zarchy et at., is an example of a size-exclusive PSA process to separate normal and isoparaffins. The PSA is combined with a catalytic process to produce an isomerized product. The adsorber is of sufficient capacity and the blowdown is controlled such that, as pressure is released during depressurization, the stoichiometric point of the mass transfer zone advances towards the end of the bed, but does not exit the bed. This description of front advancement implies that blowdown takes place at near-equilibrium. U.S. Pat. No. 4,608,061, issued to Volles et at., describes size-exclusive PSA process for the separation of normal and isobutane using 5A molecular sieve. The pressure equalization step in Volles et at. is counter-current, yet is carried out until pressure has fully equalized. U.S. Pat. No. 4,059,505 discloses a further modification to the process for separating normal and isoparaffins, whereby a mixture richer in normal paraffins than the feed is used as purge material during desorption. No reference is made to front advancement. However, the preferred time period for pressure reduction is stated as one to two minutes, during which period equilibrium would be approached.

One equilibrium selective PSA process is the separation of hydrogen from carbon oxides and/or light hydrocarbons. Instead of size-exclusion, the separation is based on differences in adsorptive strength. U.S. Pat. No. 3,564,816, issued to Batta, discloses a four-bed PSA process, whereby the adsorber is depressurized over a period of up to five minutes, using a sequence of (1) pressure equalization, (2) "provide purge," (3) another equalization, and (4) a blowdown step. During each successive step in the depressurization sequence, the impurity level rises, consistent with equilibrium desorption. U.S. Pat. No. 3,176,444, issued to Kiyonaga, teaches a PSA process whereby adsorption takes place at pressure and is discontinued prior to breakthrough so that, during cocurrent depressurization, although the stoichiometric point of the mass transfer zone advances towards the end of the bed, it does not exit the bed. Implicit in the specification is that blowdown takes place at near-equilibrium, so that the rate of desorption exceeds the rate of depressurization. U.S. Pat. No. 3,986,849, issued to Fuderer et al., teaches a process using additional beds to more efficiently pair equalization adsorbers at intermediate pressures, making the process more economical for high feed capacity. The inventors claim that the increased efficiency is due in part to better disposition of the impurities caused by breakthrough during equalization. As described by Kiyonaga, breakthrough is attributed to front advancement during depressurization, consistent with equilibrium conditions. In Fuderer et al., total depressurization time lasts up to five minutes.

It is well known in the art that adsorbate loading is related to adsorbate partial pressure. This relationship is commonly expressed by isotherms, which are graphs of adsorbate loading versus the interparticle adsorbate partial pressure. A description of isotherms and methods for their generation are given in Breck, Zeolite Molecular Sieves, John Wiley and Sons, New York, 1974, and is hereby incorporated by reference. Such isotherms show that adsorbate loading decreases with decreasing adsorbate partial pressure. Thus, the difference in adsorption and desorption pressure is the driving force behind PSA separations. However, partially because of the transient nature of the blowdown step and the relatively small contribution of the blowdown effluent to the total desorption product, PSA art has not emphasized the control of compositional changes that occur during the blowdown step, except in terms of the disposition of front advancement.

Although equilibrium depressurization has been practiced in the prior art, and has been engineered to provide benefits such as the type described by Fuderer, U.S. Pat. No. 4,726,816, no one has of yet reported observation of a non-equilibrium depressurization in size-exclusive and equilibrium selective PSA applications. Furthermore, no one has suggested the intentional promotion of a disequilibrium state in size-exclusive and equilibrium selective PSA separations as a means of enhancing performance. Accordingly, inventors continue to seek new ways to improve PSA processes.

The objective of this invention is to provide a way to decrease the bed size or, alternatively, to increase the feed capacity of conventional size-exclusive and equilibrium selective PSA processes. It is a further objective of this invention to achieve these objectives at little or no added capital or utility cost.

SUMMARY OF THE INVENTION

It has been discovered that adsorbent inventory can be decreased, and/or feed throughput increased, by controlling the depressurization rate during the blowdown step of a PSA process. The interrelated benefit of decreased adsorbent inventory or increased feed throughput is expressed as an increase in weight hourly space velocity, WHSV, which is the result of dividing the mass of adsorbent by the mass flow rate of feed. Thus, the WHSV of certain PSA processes can be increased without substantial detriment to product purity by increasing the depressurization rate during the blowdown step to the maximum rate attainable, as determined by the physical limitations of the equipment and adsorbent. This invention depressurizes at very high rates during the blowdown step to eliminate that portion of the adsorption zone that formerly contained the mass transfer front advancement while still purging the voids of non-adsorbed component(s). The result is an overall decrease in bed size at constant feed, or an increase in feed rate at constant bed size. The benefit of this application is obtained in proportion to the extent to which a state of disequilibrium between the adsorbed phase and the interparticle voids is achieved during depressurization, which is, in turn, achieved in proportion to the ratio of the depressurization rate to the desorption rate. A simple "disequilibrium" test establishes when the disequilibrium of this invention suits a particular PSA process. The invention teaches that smaller bed size and/or increased feed rates can be obtained by operating at a sufficiently high degree of disequilibrium during the blowdown step.

In one embodiment, the present invention relates to a pressure swing adsorption process for separating a feed stream by size-exclusive separation comprising a cycle including a series of sequential steps. The feed stream comprising an adsorbate fraction and a non-adsorbed fraction is passed to a first adsorbent bed of at least one adsorbent beds. Each adsorbent bed contains an adsorbent and a void space. The first adsorbent bed is operated at adsorption conditions including an adsorption pressure effective to adsorb the adsorbate fraction to provide an adsorption effluent stream having a reduced concentration of the adsorbate fraction. The first adsorbent bed undergoes a rapid blowdown step in which the first adsorbent bed is depressurized at a blowdown rate to a blowdown pressure that is lower than the adsorption pressure. During the rapid blowdown step, a blowdown effluent stream comprising the non-adsorbed fraction is withdrawn from the void space of the first adsorbent bed at the blowdown rate to induce a disequilibrium state within the first adsorbent bed such that a reduced amount of the adsorbate fraction is desorbed relative to the amount of the adsorbate fraction desorbed in an equilibrium blowdown step. Upon the termination of the rapid blowdown step in the first adsorbent bed, the first adsorbent bed is countercurrently depressurized to a desorption pressure that is lower than the blowdown pressure to desorb the adsorbate fraction from the adsorbent and to provide a desorption effluent stream that comprises the adsorbate fraction. The first adsorbent bed is repressurized and the sequential steps of the cycle are repeated to provide a continuous process.

In another embodiment, the present invention relates to a pressure swing adsorption process for separating a feed stream according to a size-exclusive separation of normal paraffins from isoparaffins comprising a cycle that includes a series of sequential steps. The feed stream comprising an adsorbate comprising normal paraffins and a non-adsorbate comprising isoparaffins is passed to a first adsorbent bed of at least two adsorbent beds. Each of the adsorbent beds contain a void space and a microporous adsorbent having a pore diameter ranging from about 4.5 to 5.5 Angstroms. The first adsorbent bed is operated at adsorption conditions, which include an adsorption pressure effective to adsorb the adsorbate, to provide an adsorption effluent stream that has a reduced concentration of normal paraffins relative to the feed stream. The first adsorbent bed is depressurized during a rapid blowdown step at a blowdown rate to a blowdown pressure that is lower than the adsorption pressure. A blowdown effluent stream comprising isoparaffins is withdrawn from the void space at the blowdown rate to induce a disequilibrium state within the first adsorbent bed such that a reduced amount of the adsorbate fraction is desorbed relative to the amount of the adsorbate fraction desorbed in an equilibrium blowdown step. The first adsorbent bed is countercurrently depressurized to a desorption pressure that is lower than the blowdown pressure to desorb the adsorbate from the adsorbent. A desorption effluent stream comprising normal paraffins is provided. The first adsorbent bed is repressurized and the sequential steps of the cycle are repeated. The invention increases WHSV in the PSA separation of normal paraffins from isoparaffins without substantially decreasing product purity. Depressurizing at very high rates during blowdown eliminates the adsorption zone required to contain the front advancement of normal paraffins while still purging the voids of isoparaffins. This results in an overall decrease in bed size at constant feed, or an increase in feed rate at constant bed size without a substantial decrease in purity.

In systems where an adsorbate-lean blowdown effluent is desired, rapid depressurization will increase performance to the extent that the rate of depressurization exceeds the rate at which adsorbate diffuses from the adsorbent into the voids. This rapid depressurization during blowdown can take place in a direction which is either cocurrent or countercurrent to the direction of the feed stream during adsorption, or the rapid blowdown step can be a simultaneous combination of cocurrent and countercurrent depressurization. The performance increase due to rapid depressurization may be understood by considering the equilibrium zone at the completion of the adsorption step. At the end of the adsorption step, the equilibrium zone occupies the majority of the bed, with the minority of the bed occupied by the mass transfer zone and any contingency for mass transfer front advancement. Within the equilibrium zone, the adsorbent is fully loaded with adsorbate, and the composition of the gas mixture occupying the voids is substantially the feed composition. As the bed is depressurized, the adsorbate within the equilibrium zone desorbs, enriching the voids. This enrichment is conventionally counter-balanced by increasing bed size to accommodate this mass transfer front advancement during depressurization. If desorption could be limited during depressurization, then this additional adsorbent would not be required. Although depressurizing at a blowdown rate exceeding the rate of desorption does not change the phenomenon of desorption, such rapid depressurization does reduce the time during which desorption can occur. In the extreme example of instantaneous depressurization, no desorption occurs. At such a condition, the blowdown effluent can be withdrawn at the feed composition with no additional bed required for front advancement. Lesser depressurization rates allow time for desorption, consequently enriching of the voids during blowdown. This invention reveals that, in systems where an adsorbate-lean blowdown effluent is desired, the weight of additional bed typically required to contain mass transfer front advancement can be reduced to the extent that the rate of depressurization exceeds the rate of desorption in size-exclusive and equilibrium selective PSA separations.

Application of this invention requires that the difference in the adsorbate loading of the particular PSA process between the beginning and ending blowdown partial pressures must be a significant fraction of the overall cyclic adsorbent loading. Consequently, it is shown that linear isotherms, which are more susceptible to desorption during blowdown than flat isotherms, are favorable for the application of this invention.

DETAILED DESCRIPTION OF THE INVENTION

A primary advantage of this invention is that, although some basic calculations and/or threshold empirical tests are required, the invention does not require substantial capital investment and can be implemented on existing PSA systems to increase maximum throughput at little or no added capital and utility costs. The instant invention reveals that adsorbent inventory of certain PSA systems characterized in this disclosure can be decreased, and/or feed throughput increased, by operating blowdown at the maximum depressurization rate permitted by the physical limitations of the system.

In commercial application, the maximum rate of depressurization can be that rate at which bed fluidization and crushing occurs. Bed fluidization occurs at flow rates where the upward force caused by pressure drop exceeds the weight of the adsorbent. The Ergun equation sets forth the relationship of pressure drop in a fixed bed:

$$\frac{\Delta P}{L} = \left[\frac{150(1-\epsilon)\mu}{D_p} + 1.75G\right]\frac{1-\epsilon}{\epsilon^3}\frac{G}{D_p\rho g}$$

where $\Delta P$ is the pressure drop across a bed of depth L; $\mu$ and $\rho$ are the viscosity and density of the mixture, respectively; G is the superficial mass flow rate; $\epsilon$ is the void fraction; and $D_p$ is the effective particle diameter and is defined as $D_p = 6V_p/A_p$, where $V_p$ and $A_p$ are the volume and external surface area of a single particle. A further discussion of these relationships may be found in R. H. Perry, C. H. Chilton, CHEMICAL ENGINEER'S HANDBOOK, McGraw-Hill Book Company, New York, fifth edition, 1973, Section 4, hereby incorporated by reference.

The Ergun equation can be used to determine: (1) the flow rate at pressure drops where fluidization and bed crushing occur, and (2) the maximum flow rate through a bed of unrestricted flow. The flow rate is often limited by fluidization and bed crushing. At the onset of fluidization during upward flow depressurization, the pressure drop is given by:

$$\frac{\Delta P}{L} = (1-\epsilon)(\rho_s - \rho_f)\frac{g}{g_c}$$

where $\rho_s$ is the density of the solid and $\rho_f$ is the fluid density. During down flow depressurization, bed crushing is avoided by preventing the downward force on the adsorbent from exceeding the crush strength of the adsorbent particle. The downward force per area is conservatively given by the sum of pressure drop and bed weight:

$$\Delta P + (1-\epsilon)\rho_s L$$

The development of this equation may be found in Rousseau, R. W., HANDBOOK OF SEPARATION PROCESS TECHNOLOGY, John Wiley & Sons (1987), hereby incorporated by reference.

Although a substantial consideration, these lifting and bed crushing parameters need not necessarily limit the present invention, due to the availability of adsorbent and bed modifications that reduce or eliminate attrition. For example, for down flow depressurization, intermediate bed supports have been used to reduce the crushing force on the adsorbent. In such a case, the only attrition is due to lateral motion of the adsorbent particles, which can be controlled by screens that rest on the adsorbent surface. When attrition is suppressed, the operative limitation on maximum flow rate is given directly by the Ergun equation, where $\Delta_p$ is the pressure drop between the blocked end of the adsorber and the product reservoir or the adsorber undergoing pressure equalization. Other, less salient limitations include those imposed by bed internals, piping, and structural limits.

As stated, the decrease in bed size is proportional to the extent to which the difference in depressurization rate and desorption rate causes a state of disequilibrium between the adsorbent and voids. This extent of disequilibrium is measured herein by $\xi_d$, termed the "degree of disequilibrium," which is defined herein as the ratio:

$$\xi_d = \frac{\Delta q_\infty - \Delta q_{bd}}{\Delta q_\infty} \quad (1)$$

where $\Delta q_\infty$ is the mass of adsorbate desorbed during equilibrium depressurization per 100 units mass of adsorbent and $\Delta q_{bd}$ is the mass of adsorbate desorbed during actual depressurization per 100 units mass of adsorbent. All subsequent references to loading, q, herein implies mass of adsorbate per 100 units mass of adsorbent, regardless of subscript or context. "Equilibrium depressurization" refers to a theoretical depressurization of the bed, at an infinitely low rate, such that the adsorbate vapors contained in the interparticle voids are maintained at equilibrium with the adsorbate adsorbed on the adsorbent. The maximum degree of disequilibrium, $\xi_{d,max}$, occurs when $\Delta q_{bd}$ is minimized, which, in turn, occurs when depressurization rate is maximized.

The degree of disequilibrium is a function of depressurization rate and of adsorbent mass transfer characteristics. A state of complete equilibrium exists when the net flux of each gas component across the adsorbent pellet control volume is zero. Disequilibrium is distinguished from equilibrium in that the net flux of one or more components is not zero. It is recognized that at least some disequilibrium will exist at all times exist in a dynamic system; however, the disequilibrium in systems where equilibrium is approached may be considered essentially negligible. As stated, the maximum depressurization rate during blowdown is determined by pressure drop, adsorbent attrition, bed internals, piping, and structural limits. A state of disequilibrium becomes harder to achieve as adsorbent mass transfer rate is increased, resulting in a low degree of disequilibrium and, consequently, a poor separation. As illustrated by Equation 1, increased mass transfer rate increases the quantity desorbed during blowdown, $\Delta q_{bd}$, which drives the numerator in the above equation to zero. Conversely, a state of disequilibrium is easily established, even at low depressurization rates, with adsorbents exhibiting low mass transfer rates. In such a situation, $\Delta q_{bd}$ is small, driving the degree of disequilibrium to unity. By increasing the blowdown rate during the blowdown step such that a disequilibrium state can be induced with a value of 0.2 and 1.0, and more preferably with a value of 0.5 and 1.0, and most preferably with a value of $\xi_d$ of between 0.75 and 1.0, an increase in the WHSV can be obtained. The ratio of the amount of adsorbate desorbed during a rapid blowdown step to the amount of adsorbate desorbed in an equilibrium blowdown step, which permits equilibrium to be established, is given by $(1-\xi_d)$. Therefore, to achieve the benefits of the invention, the rapid blowdown step is conducted such that the ratio of adsorbate desorbed during a rapid blowdown step to the adsorbate desorbed in an equilibrium blowdown step will range from about 0 to about 0.8, preferably the ratio will range from about 0. to 0.5, and more preferably the ratio will range from about 0 to 0.25. An equilibrium blowdown step is a blowdown step in which full equilibrium desorption occurs as pressure is reduced.

This invention is applicable; to those size-exclusive and equilibrium selective PSA processes in which the adsorbent isotherm exhibits a significant equilibrium loading difference, $\Delta q_\infty$, across the range through which partial pressure traverses during blowdown, in comparison to the overall equilibrium delta loading, $\Delta q$. This invention requires a substantial isotherm slope between the adsorption and blowdown cut-off pressures. Absent a substantial isotherm slope, very little desorption will occur during blowdown, even at infinitely low depressurization rates, and no advantage is gained by maximizing $\xi_d$ through rapid depressurization. The "blowdown pressure" refers to the pressure at which the rapid blowdown step is discontinued and the desorption step is initiated.

Figure 1:
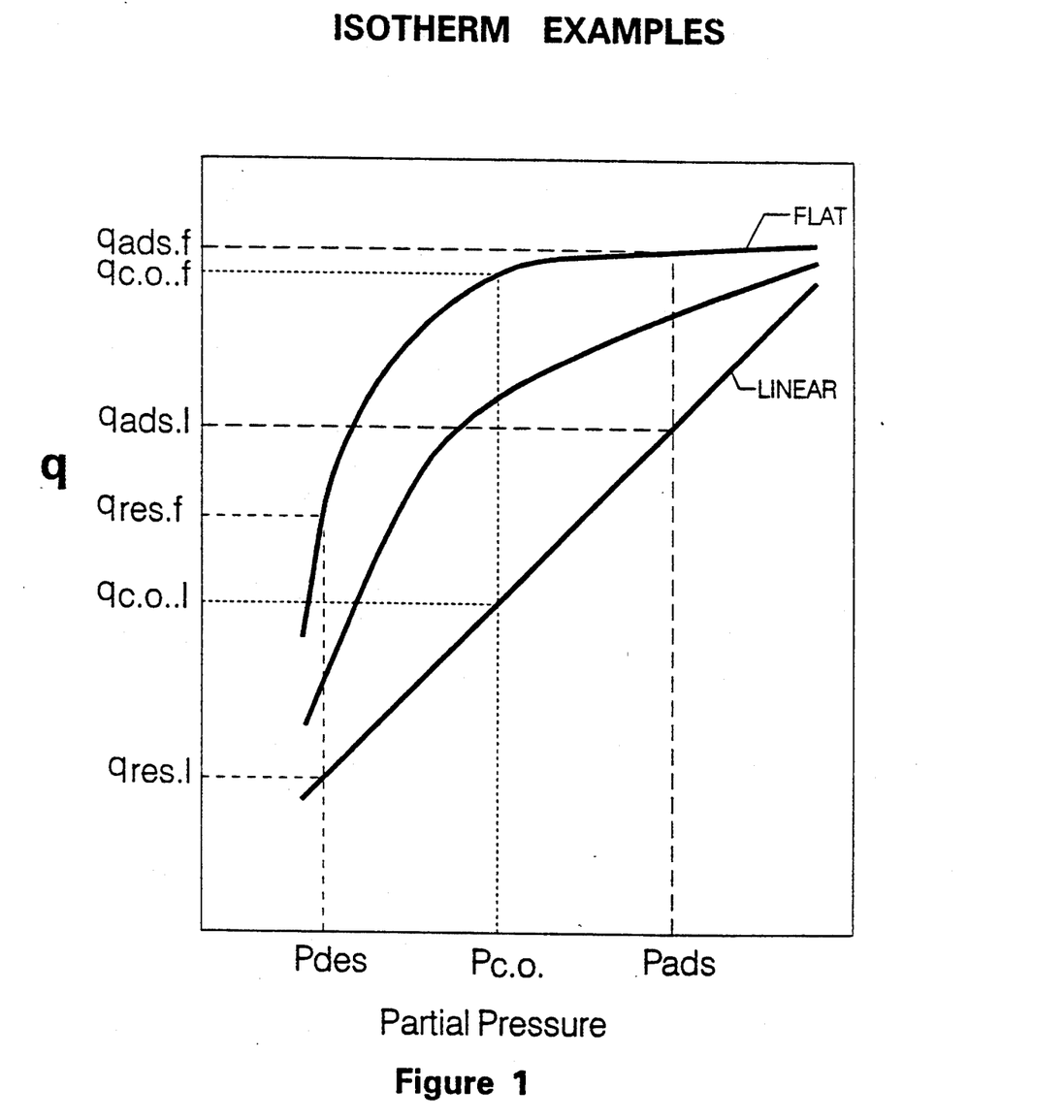
FIG. 1 is a graph illustrating the various kinds of adsorption isotherms suitable for use with the invention.

Examples of isotherms are shown in FIG. 1. Each of the isotherms exhibit about the same overall equilibrium delta loading, $\Delta q$, quantified by $(q_{ads}-q_{res})$, where $q_{ads}$ is the loading in the adsorption equilibrium zone and $q_{res}$ is the residual loading at the end of equilibrium desorption. Along the isotherm, the decrease in adsorbate partial pressure from the adsorption partial pressure, $p_{ads}$, to the blowdown cut-off partial pressure, $p_{c.o.}$, corresponds to a decrease in adsorbate loading, $(q_{ads}-q_{c.o.})$, where $q_{c.o.}$ is the equilibrium loading on the adsorbent at the blowdown cut-off partial pressure, $p_{c.o.}$. This delta loading, $\Delta q_\infty$, represents the amount of adsorbate that would normally enter the voids during blowdown, necessitating the use of adsorbent contingency to capture the resulting front advancement. The amount of adsorbent contingency to be saved by rapid depressurization is substantial if $\Delta q_\infty$ is a substantial fraction of the overall cyclic loading, $\Delta q$. If $\Delta q_\infty$ is small in relation to the overall cyclic loading, then the adsorbent saved will be a similarly small fraction of the total quantity of adsorbent in the bed. In any case, $\Delta q_\infty$ represents the maximum adsorbent loss that can be avoided by rapid depressurization. In each isotherm, the maximum fraction of adsorbate loss avoided by rapid depressurization, $f_{r,max}$, corresponds to an instantaneous depressurization, and is given by:

$$f_{r,max} = \frac{\Delta q_\infty}{\Delta q} \qquad (2)$$

Through its effect on $f_{r,max}$, the shape of an equilibrium isotherm has a major impact on the bed size reduction obtainable by rapid depressurization. Even though each of the isotherms in FIG. 1 exhibit about the same overall cyclic loading, the different shapes of the isotherms correspond to differences in the delta loading between the adsorption pressures and the blowdown cut-off pressures. A linear isotherm, which is much more susceptible to desorption during blowdown than is a flat isotherm, is the most favorable shape for this invention. Along the linear isotherm, the decrease in adsorbate partial pressure from the adsorption partial pressure, $p_{ads,l}$, to the blowdown cut-off partial pressure, $p_{c.o.,l}$, corresponds to a decrease in adsorbate loading, $(q_{ads,l}-q_{c.o.,l})$, that is substantial in comparison to the overall cyclic loading, $(q_{ads,l}-q_{res,l})$. Accordingly, the maximum fraction of adsorbate loss avoided by rapid depressurization, $f_{r,max}$, for linear isotherms is high, indicating that linear isotherms favor application of this invention. By contrast, along the flat isotherm, the decrease in adsorbate partial pressure from the adsorption partial pressure, $p_{ads,f}$, to the blowdown cut-off partial pressure, $p_{c.o.,f}$, corresponds to a small decrease in adsorbate loading, $(q_{ads,f}-q_{c.o.,f})$, in comparison to the overall cyclic loading, $(q_{ads,f}-q_{res,f})$. Accordingly, the maximum fraction of adsorbate loss avoided by rapid depressurization, $f_{r,max}$, for flat isotherms is low, indicating that flat isotherms do not favor application of this invention. In such cases, rapid depressurization will have no significant benefit, and is a detriment to product purity if the loss of voids adsorbate, otherwise captured by front advancement, exceeds the gain of preventing desorption during rapid depressurization.

The actual effectiveness of rapid depressurization is less than $f_{r,max}$ because of the rate limitations on depressurization. Those limitations reduce the amount desorbed during blowdown to a fraction of $f_{r,max}$, the fraction being the degree of disequilibrium. Therefore, the actual fraction of adsorbate loss avoided by rapid depressurization, $f_r$, is less than $f_{r,max}$, and is given by:

$$f_r = \xi_d * f_{r,max}$$

The reduction in bed size obtainable by rapid depressurization can be determined by incorporating $f_{r,max}$ and $\xi_d$ into the equilibrium zone sizing equation:

$$WES = \frac{w_{ads}\dot{m}t}{\Delta q/100[1 - f_{r,max}(1 - \xi_d)] + Y} \qquad (3)$$

where WES is the weight of the equilibrium section of the bed, $w_{ads}$ is the weight fraction of adsorbate in the feed, $\dot{m}$ is the mass flow rate of feed, and t is the adsorption time. The quantity, Y, is the mass of adsorbate remaining in the voids at the end of adsorption per unit mass of adsorbent, and is given by:

$$Y = \epsilon w_{ads} \rho_{f,ads}/\rho_b$$

where $\rho_{r,ads}$ is the density of the gas mixture at the adsorption pressure and $\rho_b$ is the bulk density of the adsorbent. Upon visual inspection of Equation 3, it is observed that the effect of disequilibrium on WES through the term, $(1-\xi_d)$, is significant only if the maximum fraction of adsorbate loss avoided by rapid depressurization, $f_{r,max}$, is itself a numerically significant value. For minimum WES, $f_{r,max}$ is preferably small but, if large, then a correspondingly large $\xi_d$ will help to minimize WES.

As stated, Weight Hourly Space Velocity, WHSV, is defined by the mass flow rate of feed divided by the total adsorbent weight, $W_{ads}$:

$$WHSV = \dot{m}/W_{ads}$$

The total adsorbent weight is the sum of the WES and the weight of adsorbent required to contain the mass transfer zone. Assuming that an added ten percent of the WES is required to contain the mass transfer zone:

$$WHSV = \frac{\dot{m}}{1.10 * WES}$$

Substituting Equation 3:

$$WHSV = \frac{\Delta q/100[1 - f_{r,max}(1 - \xi_d)] + Y}{1.10 * w_{ads}^t} \quad (4)$$

As is apparent from Equation 4, processes with high $f_{r,max}$, say 0.2 to 1.0, suffer from decreased WHSV. However, the equation also reveals that increased $\xi_d$ can act to mitigate the detrimental effect of $f_{r,max}$ on WHSV by the factoring of $f_{r,max}$ in the numerator of Equation 4 by $(1-\xi_d)$. By experimentation and by analysis of Equation 4, it has been discovered that processes which have $f_{r,max}$ of 0.2 to 1, and preferably 0.5 to 1, can obtain a WHSV increase of 2 to 50 percent by increasing $\xi_d$ through rapid depressurization.

Another consideration for the application of this invention is that the amount of desorption that is avoided by rapid depressurization, $f_r\Delta q$, must exceed the adsorbate void loss, $\epsilon(\rho_{f,ads}-\rho_{f,c.o.})V$, where $\rho_{f,c.o.}$ is the density of the gas mixture at the blowdown cut-off pressure and V is the adsorber volume. The adsorbate void loss is the amount of adsorbate contained in the interparticle voids at the end of adsorption, which is lost to the blowdown effluent during rapid depressurization. The condition is imposed because, otherwise, it may be possible to reduce bed size at a lower purity cost by simply decreasing the adsorbent used to capture front advancement. This condition thereby assures that rapid depressurization is the more efficient means of reducing bed size, in terms of product purity. The variables determining whether this condition is satisfied can usually be read from the isotherms, which are widely available in the literature. See, for example, Valenzuela, D. P., and Myers, A. L., Adsorption Equilibrium Data Handbook, Prentice Hall Div. of Simon Schuster, New Jersey (1989). Therefore, the instant invention will not usually require experimentation to determine whether the adsorbate void loss condition is satisfied. Similarly, the minimum $f_{r,max}$ can usually be verified by taking data directly from available isotherms.

The parameters controlling degree of disequilibrium are not widely available in the literature or easily calculable without empirical data. It has been discovered, however, and is disclosed herein, that a simple "disequilibrium" test can be performed to determine whether a minimum degree of disequilibrium is established at the conditions in question. The test has the advantage of requiring none of the sophisticated equipment required to determine empirical adsorption and desorption rates described in the prior art sources, cited above, but rather, can be performed using standard equipment found in most process laboratories.

The disequilibrium test can be performed by charging a laboratory scale sample cylinder, such as the type supplied by Whitey Co. or Parker Hannifin Corp., with adsorbent. The cylinder should be sized to assure that the interparticle void volume is large in comparison to the voids in related equipment. The cylinder is then exposed to a continuous stream of proposed feed composition gas mixture at the proposed adsorption pressure and at the proposed process temperature. The total amount of gas mixture should be at least 1.5 times that required to equilibrium load the adsorbent with adsorbate at those conditions. The inlet is then closed and the bed is then depressurized at the maximum rate at which a corresponding commercial adsorbent bed can be depressurized, considering the limits on depressurization outlined above. Once the cylinder pressure has reached the proposed blowdown cut-off pressure, the outlet is closed and the bed is allowed to come to equilibrium, during which time the cylinder pressure is monitored. The pressure increase during this equilibration period, $\Delta P_{eq}$, and the corresponding end composition is measured and used to calculate the adsorbate equilibrium partial pressure. The adsorbate equilibrium partial pressure, in turn, is used to calculate $\Delta q_{bd}$, which, in turn, is used to calculate $\xi_d$, according to Equation 1.

It is preferred that the process of the invention be used in size-exclusive separation or in selective separations where the mechanism of the separation is both size-exclusive and equilibrium selective. Such separations can include the separation of normal and non-normal hydrocarbons. Examples of normal and non-normal hydrocarbon separations include the separation of an adsorbate fraction comprising normal pentane and a non-adsorbate fraction comprising isopentane. The adsorbate fraction can include normal butane and the feed stream can include $C_5$ and $C_6$ non-normal hydrocarbons.

It will also be understood that the invention can be carried out using any suitable adsorbent material in the adsorption zone having a selectivity for various components of a feedstream over other such components, thereby providing a less readily adsorbable component and a more readily adsorbable component. Suitable adsorbents known in the art and commercially available include crystalline molecular sieves, activated carbons, activated clays, silica gels, activated aluminas and the like. The molecular sieves include, for example, the various forms of silicoaluminophosphates, and aluminophosphates disclosed in U.S. Pat. Nos. 4,440,871; 4,310,440 and 4,567,027, hereby incorporated by reference, as well as zeolitic molecular sieves. Preferably, the solid adsorbent selective for the adsorption of the ethylene and heavier components, or heavy cut is selected from the group consisting of silica gel, activated carbon, activated alumina, zeolite molecular sieves, and mixtures thereof.

Zeolitic molecular sieves in the calcined form may be represented by the general formula:

where Me is a cation, x has a value from about 2 to infinity, n is the cation valence and y has a value of from 2 to 10.

Typically well-known zeolites which may be used include chabazite, also referred to as Zeolite D, clinoptilolite, erionite, faujasite, also referred to as Zeolite X and Zeolite Y, ferrierite, mordenite, Zeolite A, and Zeolite P. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference. Detailed descriptions of some of the above identified zeolites may be found in D. W. Breck, ZEOLITE MO- LECULAR SIEVES, by John Wiley and Sons, New York, 1974, hereby incorporated by reference. A preferred molecular sieve for the separation is a zeolite molecular sieve comprising zeolite 5A. A molecular sieve having micropores of diameters ranging from about 4.5 Angstroms to about 5.5 Angstroms is preferred.

It is often desirable when using crystalline molecular sieves that the molecular sieve be agglomerated with a binder in order to ensure that the adsorbent will have suitable physical properties. Although there are a variety of synthetic and naturally occurring binder materials available such as metal oxides, clays, silicas, aluminas, silica-aluminas, silica-zirconias, silicathorias, silica-berylias, silica-titanias, silica-alumina-thorias, silica-alumina-zirconias, mixtures of these and the like, clay-type binders are preferred. Examples of clays which may be employed to agglomerate the molecular sieve without substantially altering the adsorptive properties of zeolite are attapulgite, kaolin, volclay, sepiolite, palygorskite, kaolinite, bentonite, montmorillonite, illite and chorite. The choice of a suitable binder and methods employed to agglomerate the molecular sieves are generally known to those skilled in the an and need not be further described herein.

The invention can be carried out as an intermittent process using a single adsorbent bed containing the molecular sieve adsorbent, but it is preferred to have at least two adsorbent beds to provide a continuous process such that at least one bed is operating in the adsorption mode, while another adsorbent bed is being regenerated. It is most preferred that the process of the invention comprise at least 3 adsorbent beds.

The process can be carded out at any adsorption pressure consistent with the adsorbent and the components to be separated. Typically, this adsorption pressure will range from about 0.7 MPa (100 psia) to about 3.5 MPa (500 psia). To achieve the benefits of the invention, the rapid blowdown step will be operated to achieve a blowdown pressure that preferably ranges from about 13 kPa (2 psia) to about 420 kPa (60 psia). Preferably, the desorption pressure will be less than atmospheric pressure.

EXAMPLES

Example I

An experimental apparatus was constructed to simulate a PSA process of the type described by Kiyonaga and Zarchy, in which normal paraffins are separated from isoparaffins by size-exclusive adsorption of the normal paraffins. The apparatus comprised liquid feed pumps, feed pre-heaters, a laboratory oven, an adsorber located in the oven, and means for regulating pressure, temperature, and flow rate. The system incorporated a double recycle loop. An inside loop recycled the isopentane, which was collected at the beginning of adsorption, for use in repressurization. The outside loop blended the net normal and iso products for re-use as feed.

The adsorber was an 1890 cc, 14.1 ft.×0.933 in. I.D. column, accommodating ca. 1400 g sample of adsorbent. The feed pre-heater temperature and oven temperature were both maintained at 260° C. (500° F.). The adsorption pressure was typically about 1035 kPA (150 psia). Adsorber temperature and pressure were sampled every two seconds. Flow rate varied from 130 to 180 g/cycle, but was usually maintained at 161 g/cycle±1 g/cycle. The adsorbent used was commercial grade 5A zeolite adsorbent in ⅛ inch pellet form. The feed was comprised of normal pentane and isopentane. The normal pentane composition in the feed varied from 8.5 to 20 weight percent. Normal butane was added in later experiments to determine its effect on performance. Although a typical commercial feed stock would also contain other isoparaffins, only isopentane was used due to its high vapor pressure and because; it accurately represents isoparaffins in general. Typically, feed composition was maintained between about 10.5 and about 13.5 percent normal pentane.

Figure 2:
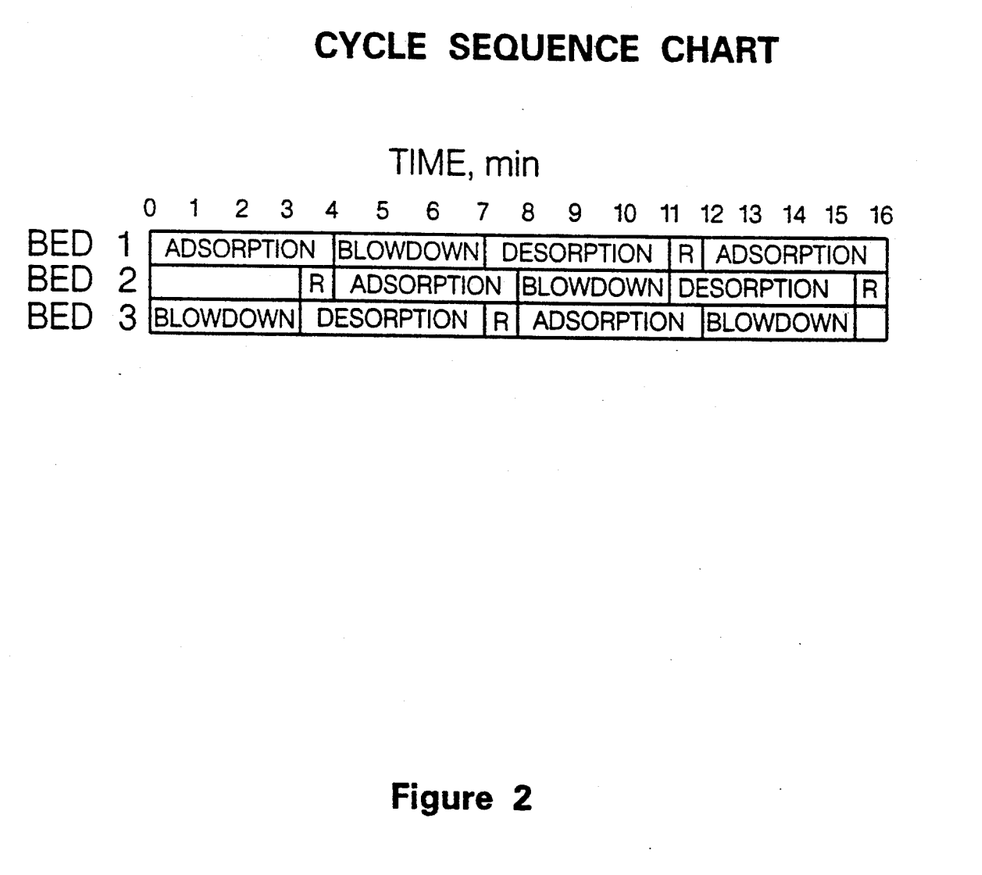
FIG. 2 is a chart illustrating a PSA cycle sequence suitable for use with the invention.

A cycle sequence diagram for the PSA process is shown in FIG. 2; Bed 1 is the pertinent adsorber. Each adsorber in this three bed configuration was set to four minutes for adsorption, three minutes for cocurrent blowdown, four minutes for vacuum desorption, and one minute for repressurization. The three minutes reserved for blowdown was consistent with similar times cited in the prior art.

Figure 3:
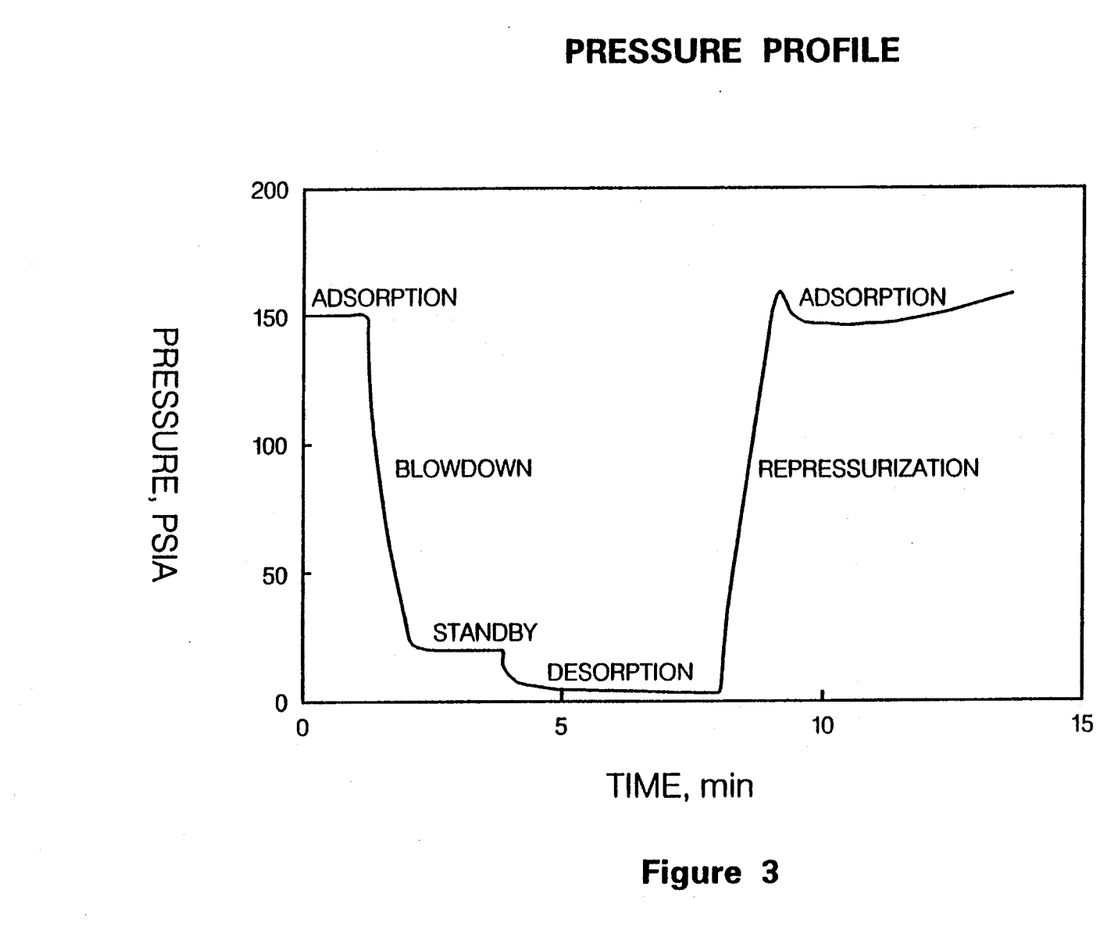
FIG. 3 is a graph illustrating the pressure profile for a conventional PSA cycle consistent with the PSA cycle shown in FIG. 2.

The cycle was programmed to switch from blowdown to desorption at 138 kPa (20 psia). The ultimate vacuum pressure during desorption was between about 3 and 6 kPa (0.5 psia and 0.9 psia). A typical pressure profile is shown in FIG. 3.

The apparatus contained a blowdown throttling valve that controlled the rate of blowdown. The first experiments were performed with the blowdown throttling valve fully open, permitting the adsorber to reach the blowdown cut-off pressure very rapidly as seen in FIG. 3, comprising a rapid blowdown step. Subsequently, the valve was adjusted to reduce the rate of blowdown to the point where the adsorber pressure would reach about 138 kPa (20 psia) in slightly less than three minutes. Several more sets of data were collected and the data were analyzed and compared. Upon comparison of the two modes of operation, the results of the "rapid blowdown" test, i.e., throttle valve fully open, were surprisingly superior to the three minute blowdown test. The initial results are given in Table 1. As shown in Table 1, when the blowdown time was nearly three minutes, the adsorption effluent contained 0.67 weight-percent normal pentane (nC5). When the throttling valve was fully open and the blowdown time was ca. 20 sec, the adsorption effluent contained 0.32 weight-percent nC5, or 50 percent less impurity than in a "normal" blowdown step.

TABLE 1

| | | Initial Blowdown Tests | | |
| --- | --- | --- | --- | --- |
| Grams of Feed | Wt. % nC5 in Feed | Blowdown Time | Wt. % nC5 in Ads. Eff. | % nC5 Recovery |
| 151.6 | 16.1% | >2 min. | 0.67% | 95.9% |
| 174.8 | 15.8% | 20 sec. | 0.32% | 96.1% |

Example II

A second set of experiments were performed using a feed normal pentane concentration that was lower than that used in the first set of experiments of Example I. The Example II data are given in top half of Table 2. In each case shown in Table 2, 161.1 grams were fed to the adsorber during the adsorption step. The data did not display the advantages of Example I because the lower composition resulted in a shortened adsorption front (equilibrium zone plus mass transfer zone), which left enough unused bed to adsorb the entire mass transfer front advancement at normal (near-equilibrium) blowdown conditions.

TABLE 2

Effect of Varying Blowdown Depressurization Rate on Commercial Grade Zeolite 5A

| | 2.5 min Blowdown | | | | 20 sec Blowdown | | | |
|---|---|---|---|---|---|---|---|---|
| | Wt. % Feed | Wt. fraction nC5 | | Percent nC5 | Wt % Feed | Wt. fraction nC5 | | Percent nC5 |
| EX | nC5 | Product | Recycle | Recovery | nc5 | Product | Recycle | Recovery |
| II | 10.4% | 0.0066 | 0.881 | 94.4 | 10.2% | 0.0063 | 0.898 | 94.5 |
|  | 12.5% | 0.010 | 0.908 | 93.4 | 12.0% | 0.010 | 0.914 | 92.5 |
| III | 15.5% | 0.021 | 0.936 | 88.3 | 15.3% | 0.016 | 0.959 | 90.9 |
|  | 15.8% | 0.023 | 0.940 | 87.5 | 14.8% | 0.011 | 0.948 | 93.8 |

Example III

A third experiment was performed wherein the feed concentration was increased from about 12 percent to about 16 percent normal pentane to verify the results of Example I and to support the results of Example II. The Example III dam, which are given in the bottom half of Table 2, again showed the normal pentane recovery advantage for a rapid blowdown step. The rapid blowdown (20 second) nC5 recovery was from about 2.6 to about 6.3 percentage points higher than the normal blowdown (2.5 minute) nC5 recovery. In addition, the rapid blowdown product purity was higher than the normal blowdown product purity by 24 to 52 percent. Thus, the lower feed composition of Example II was equivalent to adding adsorbent for mass transfer front advancement. By increasing the feed composition, this front advancement zone was eliminated, at which point the Example III data demonstrate that a rapid blowdown step results in improved recovery.

Example IV

In the previous experiments, it was noted that adsorber pressure increased when the adsorber was isolated immediately after rapid depressurization. The increase in pressure, which were due to the desorption of the adsorbate that would have otherwise desorbed during equilibrium depressurization, can be related to the degree of disequilibrium. As stated, the degree of disequilibrium is given by:

$$\xi_d = \frac{\Delta q_\infty - \Delta q_{bd}}{\Delta q_\infty}$$

Figure 4:
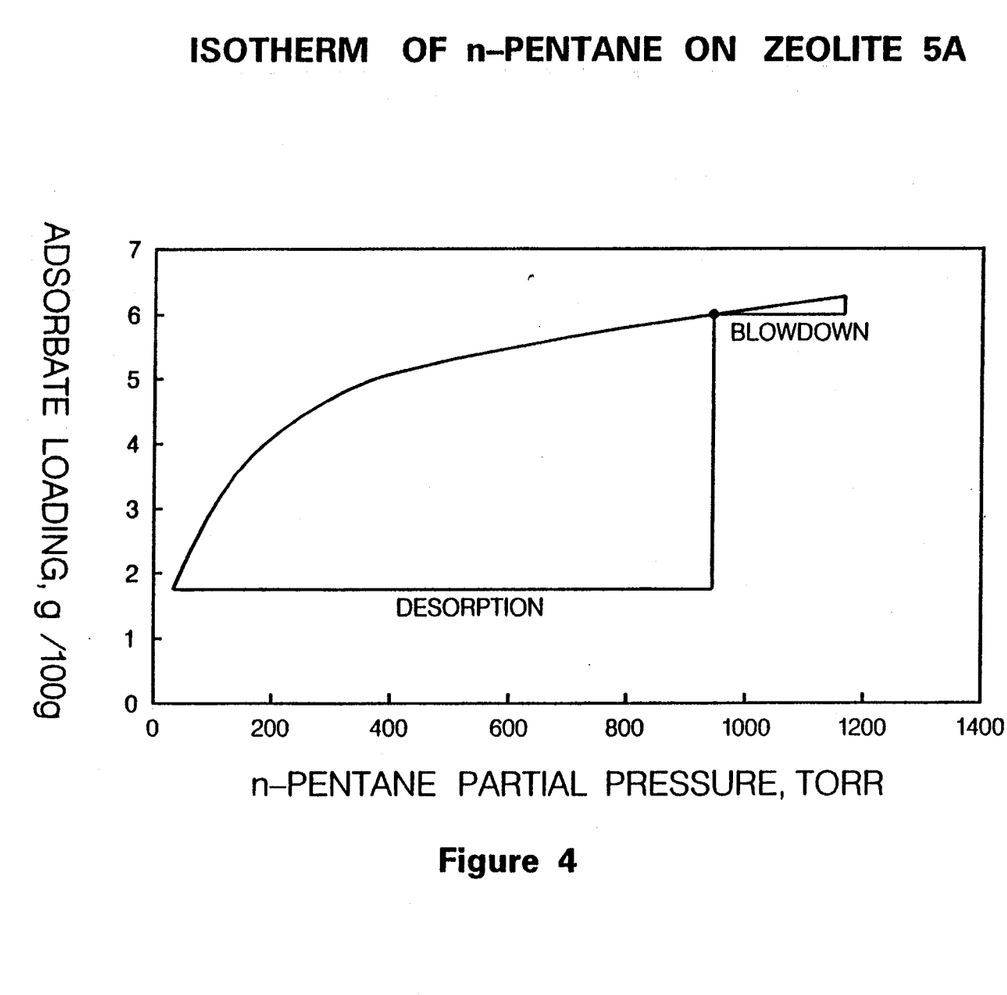
FIG. 4 is a graph illustrating the adsorption isotherm of normal pentane over a Zeolite 5A adsorbent.

The value, $\Delta q_\infty$, is obtained directly from the equilibrium isotherm. The isotherm of normal pentane on zeolite 5A is nearly linear throughout the range in which blowdown is performed, as shown in FIG. 4. From the isotherm, the change in adsorbate loading through an equilibrium depressurization blowdown, $\Delta q_\infty$, can be obtained by calculating equilibrium loading and corresponding void conditions at the adsorption pressure and at successively lower pressures as pressure is decremented by a small amount until the blowdown cut-off pressure is reached. If the decrement is sufficiently small and the interparticle voids are considered an equilibrium zone control volume, then partial pressure decreases can be related to desorption, and overall pressure decreases can be related to net flow from the voids in the equilibrium zone. The desorption and net flow from the voids, in turn, allows the estimation of loading, void composition, and adsorbate lost at the end of equilibrium depressurization blowdown. The value, $\Delta q_{bd}$, is obtained by combining data taken from the isotherm with the empirical results of a disequilibrium test.

To determine an actual degree of disequilibrium, a disequilibrium test can be performed. In this case, a one-liter cylinder was filled with 688.6 grams of commercial zeolite 5A adsorbent. Over 600 liquid cc of 15 weight percent normal pentane in isopentane was fed as a gas mixture at 500° F. and 150–165 psia. The inlet was closed and the adsorber was depressurized as rapidly as possible until a cut-off pressure was reached, corresponding to 18.3 psia at the top of the adsorber and 25 psia at the bottom. Within five minutes, the pressure increased from a conservative mean pressure of 21.65 psia to 35.5 psia. The final void composition was determined to be 54.1 percent normal pentane, yielding a final normal pentane partial pressure of 992.9 torr. According to the isotherm, this corresponds to a loading of 6.326 g/100 g, yielding a $\Delta q_{bd}$ of 0.254 g/100 g. Substituting into Equation 1, $\xi_d = 0.269$. Equation 4 is used to calculate the fractional increase in WHSV between rapid depressurization ($\xi_d = 0.269$) and equilibrium depressurization ($\xi_d = 0$). The resulting calculation yields a fractional increase of 0.0716. Therefore, rapid depressurization blowdown increases WHSV by approximately 7.2 percent. Due to this calculation's high degree of sensitivity to composition measurements, pilot plant data of the sort given in Tables 1–2 are preferred to precisely quantify the benefit of rapid depressurization. However, the disequilibrium test provides a convenient means of identifying those adsorption processes that would benefit by rapid depressurization blowdown.

We claim:

1. A pressure swing adsorption process for selectively separating a feedstream into an adsorbate fraction and a non-adsorbed fraction by size-exclusive separation comprising a cycle including the sequential steps of:
   a) passing said feedstream comprising said adsorbate fraction and the non-adsorbed fraction to a first adsorbent bed of at least one adsorbent beds containing an adsorbent and a void space, said first adsorbent bed being at adsorption conditions including an adsorption pressure effective to adsorb the adsorbate fraction to provide an adsorption effluent stream having a reduced concentration of the adsorbate fraction relative to the feedstream;
   b) depressurizing the first adsorbent bed during a rapid blowdown step at a blowdown rate to a blowdown pressure that is lower than said adsorption pressure, withdrawing a blowdown effluent stream comprising said non-adsorbed fraction from said void space to induce a disequilibrium state within said first adsorbent bed such that a reduced amount of said adsorbate fraction is desorbed relative to the amount of said adsorbate fraction desorbed in an equilibrium blowdown step;

c) countercurrently depressurizing the first adsorbent bed to a desorption pressure that is lower than said blowdown pressure to desorb the adsorbate fraction from said adsorbent and to provide a desorption effluent stream comprising the adsorbate fraction; and d) repressurizing said first adsorbent bed and repeating said sequential steps.

2. The process of claim 1 wherein said adsorbate fraction is a normal hydrocarbon and said non-adsorbed fraction is a non-normal hydrocarbon.

3. The process of claim 2 wherein said adsorbate fraction comprises normal pentane and said non-adsorbed fraction comprises isopentane.

4. The process of claim 1 wherein said adsorbent comprises a molecular sieve.

5. The process of claim 4 wherein said molecular sieve comprises a silicoaluminophosphate, an aluminophosphate or mixtures thereof.

6. The process of claim 4 wherein the molecular sieve comprises zeolite 5A.

7. The process of claim 4 wherein said molecular sieve comprises micropores of diameters ranging from 4.5 Angstroms to about 5.5 Angstroms.

8. The process of claim 5 wherein the molecular sieve comprises a zeolite molecular sieve.

9. The process of claim 1 wherein the number of adsorbent beds is at least three.

10. The process of claim 1 wherein said desorption pressure is less than atmospheric pressure.

11. The process of claim 1 wherein said blowdown rate of said rapid blowdown step is greater than 34 kPa/second.

12. The process of claim 1 further comprising admixing said blowdown effluent with said adsorption effluent.

13. The process of claim 1 wherein the adsorption pressure ranges from about 0.7 MPa to about 3.5 MPa (100 to about 500 psia).

14. The process of claim 1 wherein the blowdown pressure ranges from about 13 kPa to about 420 kPa (2 to about 60 psia).

15. The process of claim 1 wherein said rapid blowdown step takes place cocurrently, countercurrently or a combination thereof in relation to step (a).

16. The process of claim 15 wherein a ratio of the amount of adsorbate desorbed during step (b) to an amount of adsorbate desorbed in said equilibrium blowdown step ranges from about 0 to about 0.8.

17. The process of claim 16 wherein said ratio ranges from about 0 to about 0.5.

18. The process of claim 16 wherein said ratio ranges between about 0 and about 0.25.

19. A pressure swing adsorption process for separating a feedstream into an adsorbate fraction and a non-adsorbed fraction according to a size-exclusive separation said process comprising a cycle including the sequential steps of:

a) passing said feedstream comprising the adsorbate fraction comprising normal pentane and a mixture thereof with the non-adsorbed fraction comprising isopentane to a first adsorbent bed of at least two adsorbent beds, each of said adsorbent beds containing a microporous adsorbent having a pore diameter ranging from about 4.5 Angstroms to about 5.5 Angstroms and a void space, said first adsorbent bed being at adsorption conditions including an adsorption pressure effective to adsorb the adsorbate fraction to provide an adsorption effluent stream having a reduced concentration of normal pentane relative to the feedstream;

b) depressurizing the first adsorbent bed during a rapid blowdown step at a blowdown rate to a blowdown pressure that is lower than the adsorption pressure, withdrawing a blowdown effluent stream comprising isopentane from said void space to induce a disequilibrium state within said first adsorbent bed such that a reduced amount of said adsorbate fraction is desorbed relative to the amount of said adsorbate fraction desorbed in an equilibrium blowdown step;

c) countercurrently depressurizing the first adsorbent bed to a desorption pressure that is lower than said blowdown pressure to desorb the adsorbate from said adsorbent and to provide a desorption effluent stream comprising normal pentane; and d) repressurizing said first adsorbent bed and repeating said sequential steps.

20. The process of claim 19 wherein step (b) is performed in a direction which is countercurrent to step (a).

21. The process of claim 19 wherein step (b) is performed in a direction which is cocurrent to step (a).

22. The process of claim 19 wherein step (b) is performed in a direction which is simultaneously countercurrent and cocurrent to step (a).

23. The process of claim 19 wherein said disequilibrium state within said first adsorbent bed during said rapid blowdown step is characterized by a value of the degree of disequilibrium ($\xi_d$) ranging from about 0.5 and about 1.0 in accordance with the formula:

$$\xi_d = \frac{\Delta q_\infty - \Delta q_{bd}}{\Delta q_\infty}$$

wherein: $\Delta q_\infty$ = mass of adsorbate desorbed during an equilibrium depressurization per 100 mass units of adsorbent, $\Delta q_{bd}$ = mass of adsorbate desorbed during an actual depressurization per 100 mass units of adsorbent.

24. A pressure swing adsorption process for selectively separating a feedstream into an adsorbate fraction and a non-adsorbed fraction by equilibrium-selective separation comprising a cycle including the sequential steps of:

a) passing said feedstream comprising said adsorbate fraction and the non-adsorbed fraction to a first adsorbent bed of at least one adsorbent beds containing an adsorbent and a void space, said first adsorbent bed being at adsorption conditions including an adsorption pressure effective to adsorb the adsorbate fraction to provide an adsorption effluent stream having a reduced concentration of the adsorbate fraction relative to the feedstream;

b) depressurizing the first adsorbent bed during a rapid blowdown step at a blowdown rate to a blowdown pressure that is lower than said adsorption pressure, withdrawing a blowdown effluent stream comprising said non-adsorbed fraction from said void space to induce a disequilibrium state within said first adsorbent bed such that a reduced amount of said adsorbate fraction is desorbed relative to the amount of said adsorbate fraction desorbed in an equilibrium blowdown step;

c) countercurrently depressurizing the first adsorbent bed to a desorption pressure that is lower than said blowdown pressure to desorb the adsorbate fraction from said adsorbent and to provide a desorption effluent stream comprising the adsorbate fraction; and d) repressurizing said first adsorbent bed and repeating said sequential steps.

* * * * *